United States Patent
Bernasconi et al.

(10) Patent No.: US 8,983,306 B2
(45) Date of Patent: Mar. 17, 2015

(54) SPECTRAL ALIGNMENT OF A WDM DEVICE TO A SPECIFIED FREQUENCY GRID

(75) Inventors: Pietro A. G. Bernasconi, Aberdeen, NJ (US); David T. Neilson, Old Bridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/294,410

(22) Filed: Nov. 11, 2011

(65) Prior Publication Data
US 2012/0195593 A1    Aug. 2, 2012

Related U.S. Application Data (60) Provisional application No. 61/437,861, filed on Jan. 31, 2011.

(51) Int. Cl.
| H04B 10/04 | (2006.01) |
| H04B 10/12 | (2006.01) |
| H04B 10/50 | (2013.01) |
| H04B 10/572 | (2013.01) |

(52) U.S. Cl.
CPC ............ *H04B 10/506* (2013.01); *H04B 10/572* (2013.01)
USPC ............................. 398/195; 398/196; 398/201

(58) Field of Classification Search
None
See application file for complete search history.

(56) References Cited

U.S. PATENT DOCUMENTS

| 6,204,945 | B1 * | 3/2001 | Iwata et al. | 398/9 |
| 6,323,987 | B1 * | 11/2001 | Rinaudo et al. | 359/260 |
| 6,349,103 | B1 * | 2/2002 | Chung et al. | 372/32 |
| 7,636,522 | B2 * | 12/2009 | Nagarajan et al. | 398/79 |

OTHER PUBLICATIONS

Agilent, Agilent Spectrum Analysis Basics, p. 32-33, Aug. 2, 2006.*
Leijtens et al., Wavelength Filters in Fibre Optics, 2006. Springer Berlin Heidelberg, p. 129-130.*
Weik, Martin. Fiber Optics Standard Dictionary, 1997. Chapman & Hall, 3rd Ed. p. 748.*
Venghaus, Wavelength Filters in Fibre Optics, 2006, Springer-Verlag Berlin Heidelberg, pp. 128-129.*
Neilson, David Thomas and Bernasconi, Pietro Arturo, "Direct Laser Modulation Background," U.S. Appl. No. 61/390,876, filed Oct. 7, 2010 (32 pages).

(Continued)

*Primary Examiner* — Ken Vanderpuye
*Assistant Examiner* — Jai Lee
(74) *Attorney, Agent, or Firm* — Mendelsohn, Drucker & Dunleavy, P.C.; Yuri A. Gruzdkov (57) ABSTRACT

A WDM device having a controller that individually controls the operating parameters of tunable lasers and the temperatures of an optical multiplexer and etalon. The device employs a spectral analyzer to measure the spectral composition of the optical output signal produced by the device. Based on the analyses of the measured spectral composition, the controller sets the temperatures of the tunable lasers, optical multiplexer, and optical etalon to values that cause: (i) middle frequencies of transmission bands of the optical multiplexer to be spectrally aligned with the corresponding frequencies of the specified frequency grid, (ii) each laser line to be properly positioned within the corresponding transmission band, and (iii) transmission resonances of the optical etalon to be properly positioned with respect to the laser lines.

12 Claims, 6 Drawing Sheets

(56) References Cited

OTHER PUBLICATIONS

8Neilson, David Thomas and Bernasconi, Pietro Arturo, "Direct Laser Modulation," U.S. Appl. No. 12/945,429, filed Nov. 12, 2010 (25 pages).

Gill, Douglas M., "Wavelength Aligning Multi-channel Optical Transmitters Background," U.S. Appl. No. 12/945,550, filed Nov. 12, 2010 (36 pages).

Neilson, David Thomas and Bernasconi, Pietro Arturo, "Direct Laser Modulation," U.S. Appl. No. 13/018,109, filed Jan. 31, 2011 (33 pages).

* cited by examiner

SPECTRAL ALIGNMENT OF A WDM DEVICE TO A SPECIFIED FREQUENCY GRID

CROSS-REFERENCE TO RELATED APPLICATIONS

This application claims priority from U.S. Provisional Patent Application No. 61/437,861 filed on Jan. 31, 2011 and entitled "SPECTRAL ALIGNMENT OF A WDM DEVICE TO A SPECIFIED FREQUENCY GRID," which is incorporated herein by reference in its entirety.

BACKGROUND

1. Field

The present invention relates to optical communication equipment and, more specifically but not exclusively, to WDM (wavelength division multiplexing) devices.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A typical WDM system uses a multiplexer at the transmitter site to join individual modulated optical signal streams together for transmission over the optical link, and a de-multiplexer at the receiver site to split the streams apart for detection and decoding. The system may also employ optical add-drop multiplexers, frequency converters, signal regenerators, and a variety of optical filtering devices, such as etalons and phase masks. To achieve seamless operation, different components of the WDM system usually are appropriately spectrally aligned to a specified frequency grid.

SUMMARY

Disclosed herein are various embodiments of an optical WDM device having a controller that can individually control the operating parameters of tunable lasers and the temperatures of an optical multiplexer and etalon. The optical device employs a spectral analyzer to measure the spectral composition of the optical output signal produced by the device. Based on the analyses of the measured spectral composition, the controller sets the operating parameters for the tunable lasers and the temperatures of the optical multiplexer and etalon to values that cause: (i) middle frequencies of transmission bands of the optical multiplexer to be spectrally aligned with the corresponding frequencies of the specified frequency grid, (ii) each laser line to be appropriately positioned within the corresponding transmission band, and (iii) transmission resonances of the optical etalon to be appropriately positioned (e.g., spectrally aligned or controllably shifted) with respect to the laser lines.

According to one embodiment, provided is an optical method comprising the steps of: in an optical multiplexer that is periodic in its frequency response, receiving light from a parallel array of lasing lasers, each laser of the array being connected to a different optical input of the optical multiplexer; measuring spectral intensities of light output from the optical multiplexer in response to the receiving light therein, the measuring being performed over one or more wavelength ranges, each of the one or more wavelength ranges excluding wavelengths at which the lasers lase; and adjusting a spectral location of one or more optical pass bands of the optical multiplexer based on the measured spectral intensities.

According to another embodiment, provided is an apparatus comprising a plurality of lasers, each laser configured to produce light having a corresponding optical-carrier frequency, and a plurality of laser-control units, each unit coupled to a corresponding one of the lasers. The apparatus further comprises an optical multiplexer configured to multiplex the light generated by the lasers to produce an optical output signal; a first temperature-control unit thermally coupled to the lasers and the optical multiplexer; and a controller operatively connected to control the laser-control units and the first temperature-control unit based on a spectral composition of the optical output signal.

According to yet another embodiment, provided is a method of operating an optical device. The method has the step of generating an optical output signal having a plurality of optical-carrier frequencies using a plurality of lasers and an optical multiplexer that wavelength multiplexes the light produced by the lasers. The method further has the steps of measuring a spectral composition of the optical output signal using a spectral analyzer; regulating a plurality of laser-control units using a controller that is operatively connected to individually control each of the laser-control units based on the measured spectral composition, wherein each of the laser-control units is coupled to a respective one of the lasers; and regulating a first temperature-control unit using the controller, which is further operatively connected to control the first temperature-control unit based on the measured spectral composition, wherein the first temperature-control unit is thermally coupled to the plurality of lasers and the optical multiplexer.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

The most common frequency grid that is used in fiber-optic communication systems is defined by the ITU-T G.694.1 (2002) Recommendation, which is incorporated herein by reference in its entirety. This frequency grid extends from about 191.7 THz to about 196.1 THz, with a 100 GHz spacing of the channels therein. While defined in frequency units, this grid can equivalently be expressed in wavelength units, in which case the grid covers the wavelength range from about 1528.8 nm to about 1563.9 nm, with approximately 0.8 nm spacing between the centers of neighboring channels. For certain applications, the frequency grid can be extended to cover the range from about 186 THz to about 201 THz and/or further be divided to provide a 50 GHz and/or 25 GHz spacing between the centers of neighboring channels. Other frequency grids are also used in fiber-optic communication systems, albeit less frequently.

For illustration purposes, various embodiments of the invention are described below in reference to an ITU frequency grid having a spacing of 100 GHz. However, the invention is not limited to this grid. From the provided description, one of ordinary skill in the art will be able to practice various embodiments while using other frequency grids.

Figure 1A:
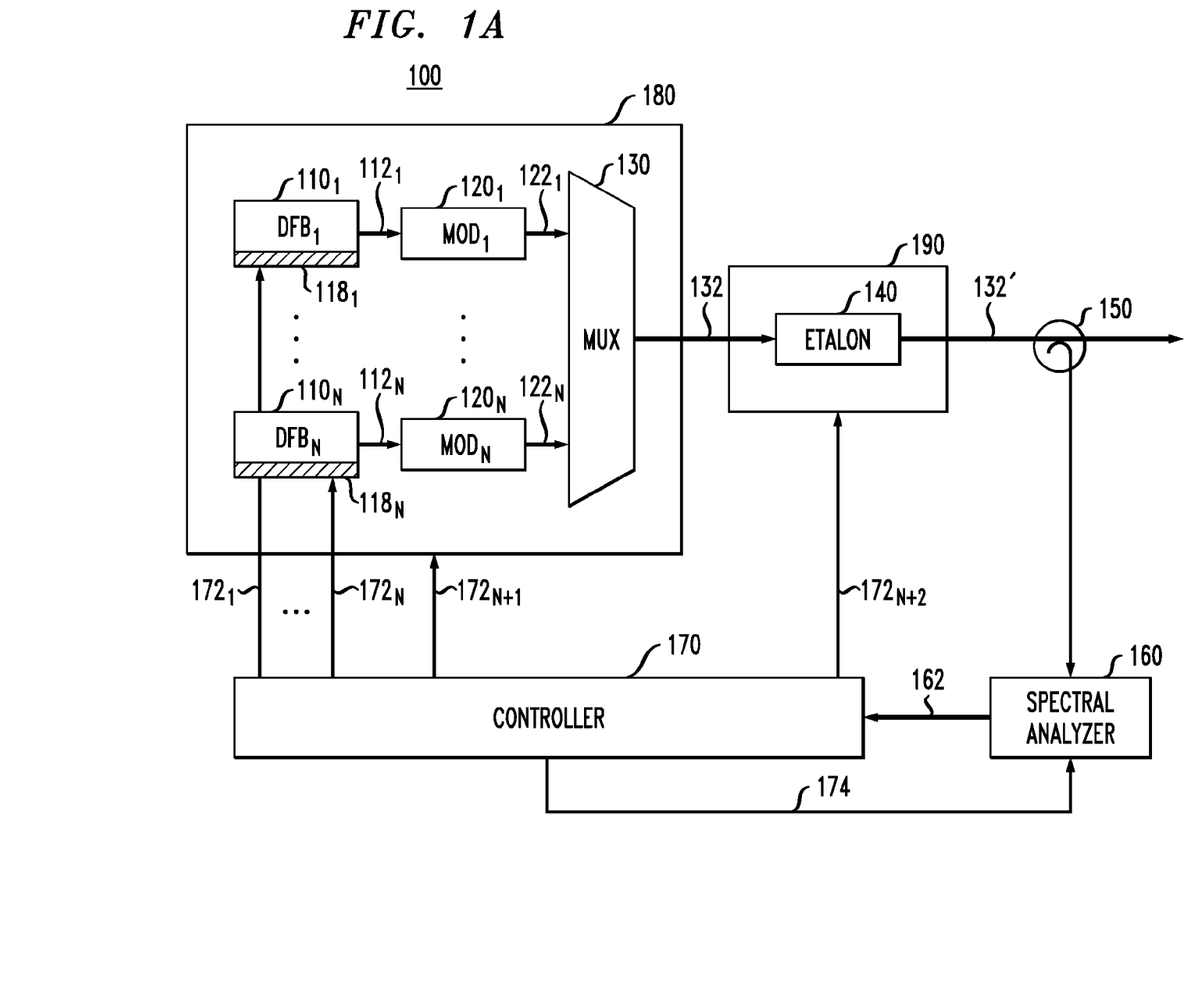
FIGS. 1A-1D show a WDM transmitter and its characteristics according to one embodiment of the invention.
Figure 1B:
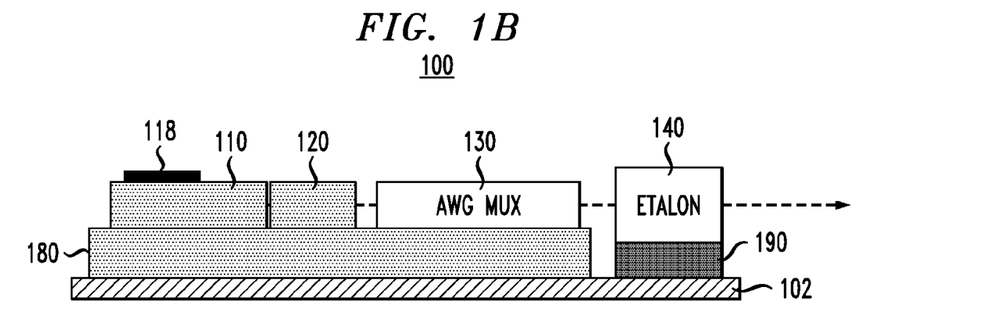
Figure 1C:
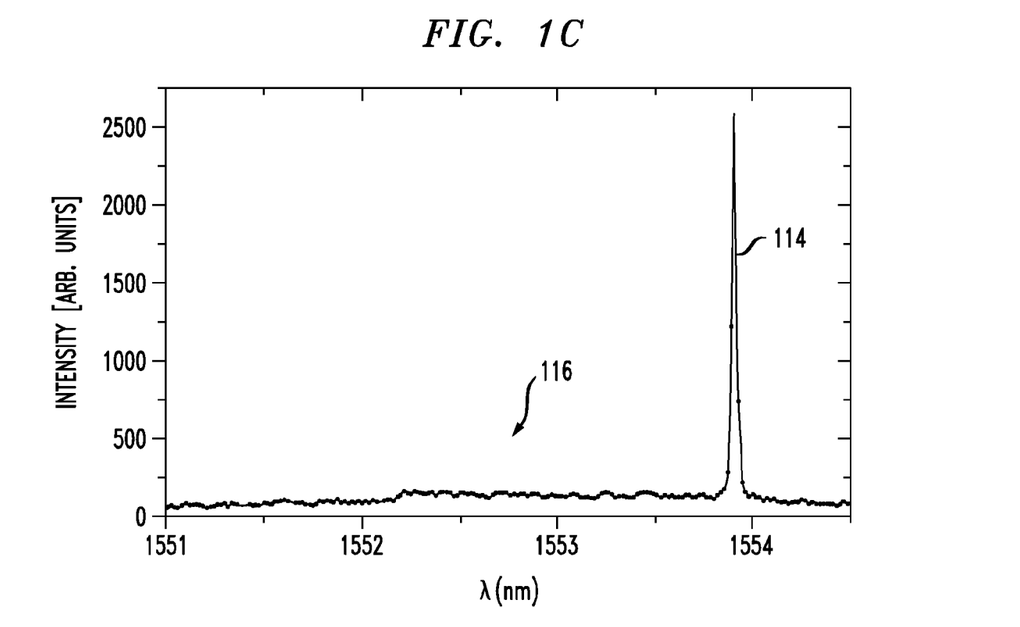
Figure 1D:
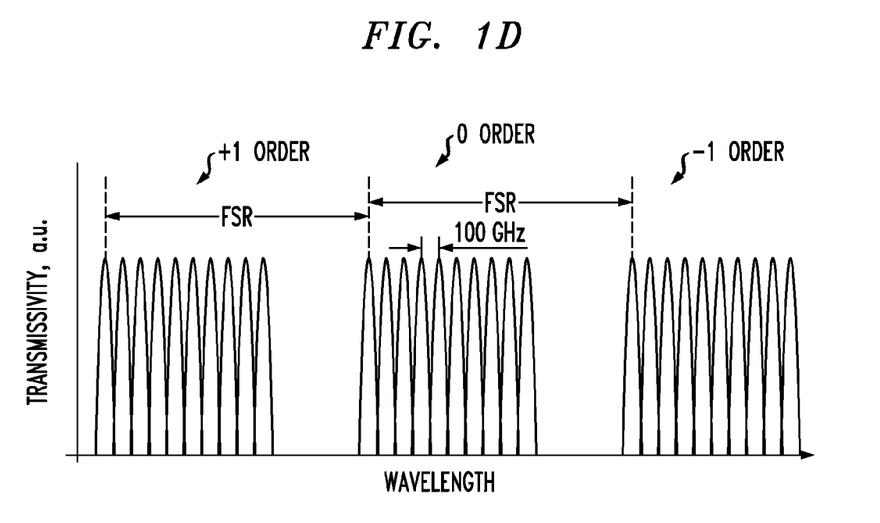

FIGS. 1A-1D show a WDM transmitter 100 and certain characteristics of this WDM transmitter according to one embodiment of the invention. More specifically, FIG. 1A shows a block diagram of transmitter 100. FIG. 1B shows a cross-sectional side view of transmitter 100. FIG. 1C shows a representative emission spectrum of one of lasers 110 in transmitter 100. FIG. 1D shows transmission characteristics of an optical multiplexer (MUX) 130 in transmitter 100.

Referring to FIG. 1A, transmitter 100 has an array of N tunable lasers $110_1$-$110_N$, each feeding a corresponding one of optical modulators $120_1$-$120_N$. In operation, each laser 110 generates a respective light beam 112 having a specified, different carrier frequency (wavelength) located on the ITU grid so that the array, as a whole, generates an emission comb with a peak-to-peak comb-line spacing of 100 GHz. Each of optical modulators 120 receives a respective drive signal (not explicitly shown in FIG. 1A) that causes the modulator to modulate the respective carrier frequency with data intended for transmission to a remote receiver. The resulting modulated optical signals $122_1$-$122_N$ are applied to (N×1) optical multiplexer (e.g., an arrayed-waveguide-type optical multiplexer) 130, where they are wavelength multiplexed to produce a WDM signal 132. In certain embodiments, WDM signal 132 is subjected to filtering in an optional optical etalon 140. The resulting filtered WDM signal 132' is then applied to an optical link (e.g., optical fiber) for transmission to the intended receiver(s). In a representative embodiment, N=10, but N may have any selected, larger or smaller positive integer value in an alternative embodiment.

In one embodiment, each of lasers $110_1$-$110_N$ is a distributed-feedback (DFB) laser. A DFB laser is a type of laser diode, quantum-cascade laser, or fiber laser in which the active region has a periodic structure. The periodic structure acts as a one-dimensional Bragg grating that defines the laser cavity and provides the optical feedback for the laser emission to occur. The grating is typically constructed so that a single longitudinal lasing mode is supported in the laser cavity. A change in the temperature of the device and/or a change in the injection current cause the pitch of the grating to change, thereby changing the wavelength of the supported lasing mode and thus the carrier frequency of light beam 112.

FIG. 1C graphically shows a representative emission spectrum of laser 110. More specifically, when laser 110 is biased to operate above the lasing threshold, the laser's output consists of (i) a relatively strong and narrow laser line 114 that is produced by stimulated emission and corresponds to the supported longitudinal lasing mode and (ii) a relatively weak and broad emission band 116 that is produced by amplified spontaneous emission (ASE). The wavelength corresponding to the maximum of laser line 114 is sometimes referred to as the lasing wavelength. Note that ASE band 116 is typically present on both sides of laser line 114 regardless of the intensity or spectral location of the laser line. The relative intensity of laser line 114 and ASE band 116 can be controlled, for example, by controlling the injection current applied to the laser cavity.

In an alternative embodiment, a coupled laser-modulator pair (e.g., laser $110_i$ and modulator $120_i$) in transmitter 100 can be replaced by a directly modulated laser (DML). Similar to DFB lasers, DML lasers are temperature-tunable and produce an ASE band that is similar to ASE band 116, in addition to the corresponding laser line that is similar to laser line 114. DML lasers suitable for use in transmitter 100 are commercially available, e.g., from JDS Uniphase Corporation headquartered in Milpitas, Calif.

In one embodiment, optical multiplexer 130 is implemented using an arrayed waveguide grating (AWG). A representative AWG is a planar waveguide circuit having a plurality of waveguides coupled between two optical star couplers. Wavelength selection in an AWG is based on light interference, which causes only certain wavelengths applied to the input ports of the input star coupler to interfere constructively at the output port of the output star coupler. Since the interference depends on the index of refraction of the waveguide material(s), the passband wavelengths in an AWG shift when the temperature of the AWG changes.

FIG. 1D graphically shows a transmission spectrum of a representative AWG that can be used to implement optical multiplexer 130 in transmitter 100. Note that the shown transmission spectrum corresponds to N=10, but, as already indicated above, N may be different from 10 in alternative embodiments. The transmission spectrum is periodic, with the spectral period usually referred to as the FSR (free spectral range). A spectral range that covers approximately three FSRs is shown in the FIG. 1D. Each FSR order has ten transmission bands (also sometimes referred to as pass bands), with each band corresponding to a different respective input port of optical multiplexer 130. As indicated in FIG. 1D, the spectral separation between adjacent transmission bands is 100 GHz, which causes the transmission bands to be closely bundled together so that the transmission-band bundles corresponding to different FSR orders of optical multiplexer 130 are separated from each other by spectral regions in which the optical multiplexer transmits very little light. The spectral width of the gap between transmission-band bundles may vary depending upon the specific design of the AWG. For example, the gap may be as wide as a relatively large number of transmission bands or be reduced to zero, thereby causing different transmission-band bundles to form a continuous sequence of passbands. For all practical purposes, a temperature change causes the spectrum shown in FIG. 1D to shift along the abscissa, with substantially no change in the relative positions of the bands and band bundles with respect to one another.

In one embodiment, etalon 140 is implemented using a transparent plate (e.g., made of fused silica) having its two parallel reflecting surfaces coated with a dielectric coating. This type of an etalon is often referred to as a solid Fabry-Pérot etalon. Similar to the transmission spectrum of an optical multiplexer (FIG. 1D), the transmission spectrum of a solid Fabry-Pérot etalon is temperature tunable. However, the transmission resonances of etalon 140 are typically significantly narrower than the transmission bands of optical multiplexer 130. In various alternative embodiments, other etalon versions, such as air-spaced Fabry-Pérot, VIPA (virtually imaged phased array), Gires-Tournois, and multi-cavity, can similarly be used. In various embodiments, etalon 140 can be implemented so that the band spacing in optical multiplexer 130 is an integer multiple of the FSR value of the etalon.

Maximum transmitted power, which is often considered to constitute an approximate optimum operating condition for transmitter 100, is typically achieved under the following conditions. The maxima of the transmission bands in a selected FSR order of optical multiplexer 130 (e.g., the 0-FSR order in FIG. 1D) are approximately spectrally aligned with the corresponding frequencies (wavelengths) of an ITU frequency grid. Laser line 114 (FIG. 1C) of each laser 110 is approximately centered within the corresponding transmission band of the 0-FSR order of optical multiplexer 130 to reduce the insertion loss in the optical multiplexer. Transmission resonances of etalon 140 are approximately spectrally aligned with the laser lines 114 of lasers $110_1$-$110_N$ to reduce the ASE noise and increase the output power. It is also worth noting that, in certain configurations, the transmission resonances of etalon 140 may be intentionally shifted with respect to the ITU frequency grid to introduce a desired spectral filtering of the signals that may positively affect signal transport in the optical link.

Referring now to FIGS. 1A-1B, to enable transmitter 100 to operate in a desired regime, the transmitter may have a controller 170 that can individually control, via a corresponding one of control signals $172_1$-$172_{N+2}$, each of laser-control units $118_1$-$118_N$, temperature-control unit 180, and temperature-control unit 190. Temperature-control unit 180 is thermally coupled to regulate the temperature(s) of lasers $110_1$-$110_N$, modulators $120_1$-$120_N$, and optical multiplexer 130. For example, temperature-control unit 180 may be affixed to a base plate (e.g., circuit board) 102, with each of lasers 110, modulators 120, and optical multiplexer 130 being attached to temperature-control unit 180 as indicated in FIG. 1B. Each of laser-control units $118_1$-$118_N$ is a circuit that can change the injection current applied to the cavity of the corresponding one of lasers $110_1$-$110_N$ and/or can regulate the temperature of the laser without changing the injection current. Note that laser-control unit 118 is designed to provide localized temperature control in the area it is attached to and, as such, has little effect on the temperature of modulator 120, optical multiplexer 130, or other lasers 110. Temperature-control unit 190 is thermally coupled to regulate the temperature of etalon 140. The relatively poor heat conductance of base plate 102 and air gaps between optical multiplexer 130 and etalon 140 and between temperature-control units 180 and 190 ensure that temperature-control unit 180 and temperature-control unit 190 efficiently and separately control the temperatures of optical multiplexer 130 and etalon 140, respectively. In various embodiments, each of control units $118_1$-$118_N$, 180, and 190 can be implemented using a respective thermoelectric cooler and/or a respective resistive heater. Note that certain models of thermoelectric coolers are operationally reconfigurable and, depending on the configuration, the same device can operate as a cooler or as a heater.

Controller 170 generates control signals $172_1$-$172_{N+2}$ based on a feedback signal 162 that is generated by an optical spectral analyzer 160 based on a portion of output signal 132' (or 132, if optional etalon 140 is omitted) that the spectral analyzer receives via an optical tap 150. Spectral analyzer 160 is designed to measure the spectral composition of the received optical signal at sufficient spectral resolution within a certain spectral window, whose position can be moved (tuned) within a specified spectral range. Controller 170 uses a control signal 174 to control the position of the spectral window captured by spectral analyzer 160 and also to configure the spectral analyzer to start and stop spectrum acquisition. Spectral analyzer 160 provides the acquired spectra to controller 170 via feedback signal 162. In one embodiment, the width of the spectral window captured by spectral analyzer 160 in one acquisition is smaller than or about the same as one FSR of optical multiplexer 130 (see FIG. 1D). In another embodiment, the width of the spectral window captured by spectral analyzer 160 in one acquisition is greater than or about the same as three FSRs of optical multiplexer 130.

Figure 2:
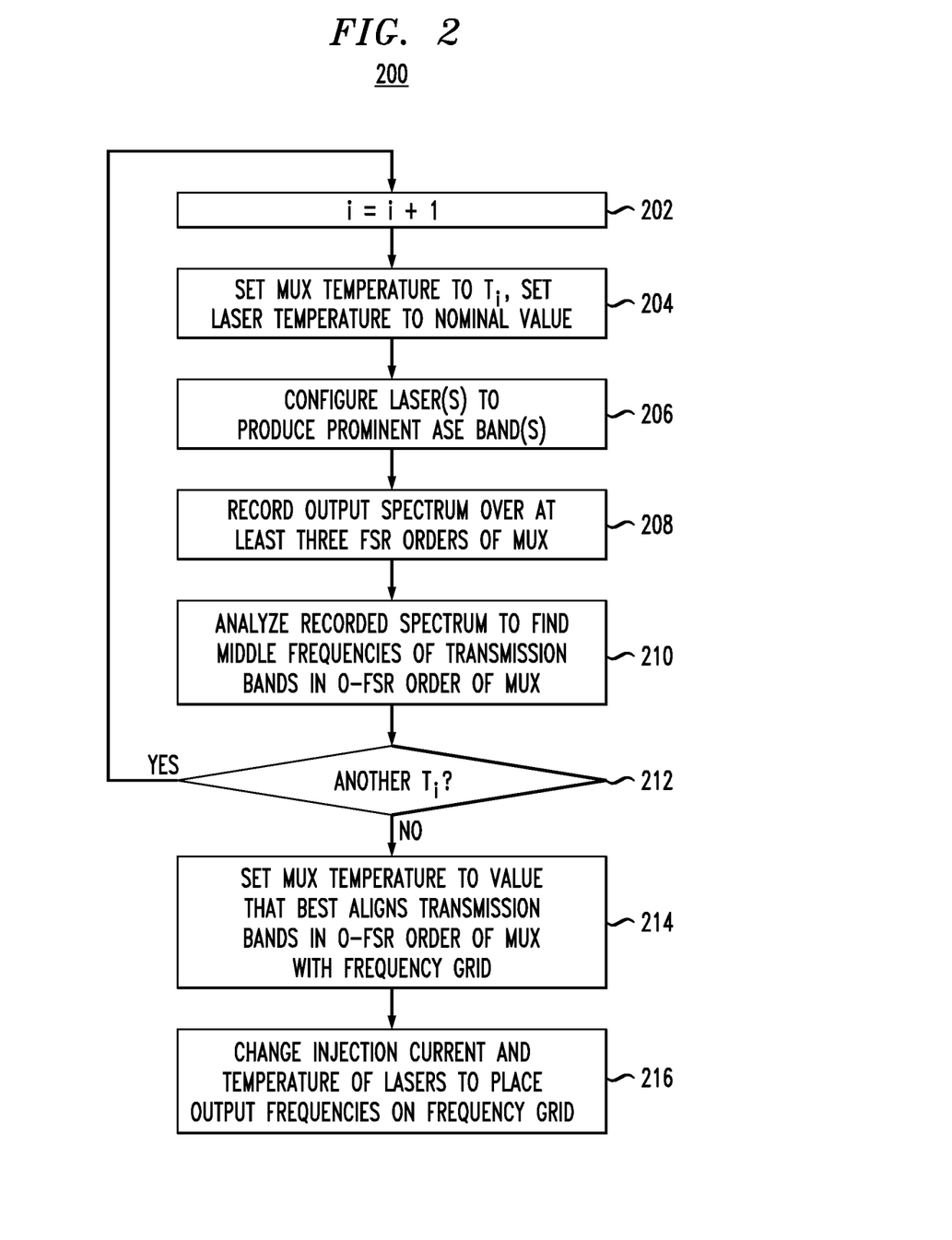
FIG. 2 shows a flowchart of a method that can be used to configure the transmitter shown in FIG. 1A for optimal operation according to one embodiment of the invention.

FIG. 2 shows a flowchart of a method 200 that can be used to configure transmitter 100 (FIG. 1A) for operation according to one embodiment of the invention. Note that method 200 corresponds to an embodiment of transmitter 100 in which etalon 140 is absent. Modifications of method 200 that can be used when etalon 140 is present are described further below in reference to FIGS. 4-5.

Prior to step 202, method 200 is initiated with the initial value of an index i set to zero. Then, at step 202, index i is incremented by 1.

At step 204, controller 170 may use control signal $172_{N+1}$ to configure temperature-control unit 180 to set the temperature of optical multiplexer 130 to $T_i$. In one implementation of step 204, the following set of temperatures $T_i$ can be used: $T_1$=20° C.; $T_2$=70° C.; $T_3$=30° C.; $T_4$=60° C., etc. Controller 170 uses control signals $172_1$-$172_N$ to configure laser-control units $118_1$-$118_N$ to set the temperatures of lasers $110_1$-$110_N$ to a selected nominal value, e.g., 30° C.

At step 206, one or more of lasers $110_1$-$110_N$ are configured to operate above the lasing threshold so that the corresponding ASE band(s) 116 (FIG. 1C) are relatively prominent (e.g., have sufficiently high intensity to enable spectral analyzer 160 to detect and measure the corresponding light after it passes through optical multiplexer 130 and optical tap 150). Note that, in this embodiment, modulators $120_1$-$120_N$ are configured not to perform data modulation at this time. In an alternative embodiment, modulators $120_1$-$120_N$ may be configured to perform data modulation during step 206.

At step 208, controller 170 may use control signal 174 to configure spectral analyzer 160 to record the spectrum of the resulting output signal 132 over at least three FSR orders of optical multiplexer 130, for example, the −1, 0, and +1 FSR orders shown in FIG. 1D. Depending on the width of the spectral window captured by spectral analyzer 160 in one acquisition, more than one spectrum acquisition may need to be performed, with the concomitant shift of the spectral window between the acquisitions, to cover the three FSR orders with sufficient spectral resolution. The recorded spectrum is then transferred via feedback signal 162 to controller 170 for processing.

Figure 3:
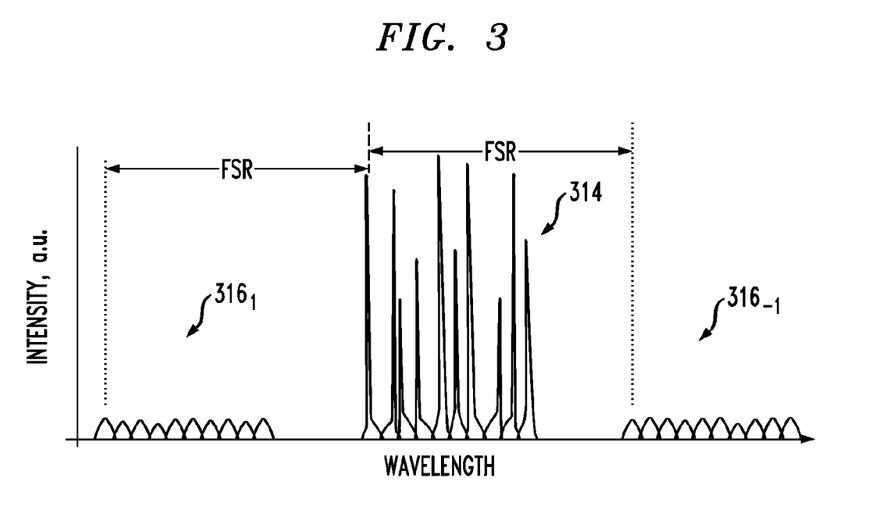
FIG. 3 graphically shows a representative spectrum that might be recorded at one of the steps of the method shown in FIG. 2.

FIG. 3 graphically shows a representative spectrum that might be recorded at step 208. The recorded spectrum typically has (i) a first set $316_1$ of bands corresponding the +1-FSR order of optical multiplexer 130, (ii) a second set 314 of peaks corresponding the 0-FSR order of the optical multiplexer, and (iii) a third set $316_{-1}$ of bands corresponding the −1-FSR order of the optical multiplexer. The bands of set $316_1$ are produced by the light of ASE bands 116 (FIG. 1C) that have been subjected to optical filtering in the +1-FSR order of optical multiplexer 130 (FIG. 1D). The bands of set $316_{-1}$ are similarly produced by the light of ASE bands 116 that have been subjected to optical filtering in the −1-FSR order of optical multiplexer 130. Since ASE bands 116 are relatively broad and substantially spectrally flat over each transmission-band bundle, the middle frequency of each band in each band set 316 matches with relatively high accuracy the middle frequency of the corresponding transmission band of optical multiplexer 130 (FIG. 1D).

Each of the peaks in set 314 has a relatively narrow line that corresponds to laser line 114 of the corresponding laser 110. This narrow line sits on top of a wider base that is produced by the light of ASE band 116 (FIG. 1C) subjected to optical filtering in optical multiplexer 130 (FIG. 1D). Note that the individual laser lines 114 are not necessarily centered on their respective bases at this stage of the spectral-alignment procedure because the temperatures of lasers $110_1$-$110_N$ are set to nominal values (see step 204) and the injection currents are set to produce a relatively high intensity in ASE bands 116, which settings may differ from the settings that center the laser lines within the respective transmission bands of optical multiplexer 130. Furthermore, in certain situations, some or all of the individual laser lines 114 might even be located outside the respective transmission bands of optical multiplexer 130.

If spectral analyzer 160 has a spectral window that is about one FSR in width, then step 208 may be implemented with two spectrum acquisitions, one for capturing the bands of set $316_{-4}$ and another one for capturing the bands of set $316_1$. The spectrum acquisition in which the spectral window covers the spectral region containing set 314 may be omitted. In this case, the spectrum transferred to controller 170 for processing may have no data in the middle portion of the spectrum shown in FIG. 3.

Referring back to FIG. 2, at step 210 of method 200, controller 170 analyzes the spectrum recorded at step 208. For example, each of band sets $316_{-1}$ and $316_1$ or a respective portion of each of these band sets may be fitted with a multi-peak function to determine the middle frequencies of the individual bands in the band set. In one exemplary implementation, the fitting function for fitting one band set 316 may be a multi-Gaussian function given by Eq. (1):

$$I(f) = A_0 + \sum_{n=0}^{N-1} a_n \exp-\left(\frac{f - f_0 + n\Delta f}{2\sigma}\right)^2 \quad (1)$$

where f is the frequency; I(f) is the spectral intensity as a function of frequency in the recorded spectrum; $A_0$ is a constant; $\alpha_n$ is the amplitude of the n-th Gaussian peak; $f_0$ is the middle frequency of the Gaussian peak corresponding to n=0; $\Delta f$ is the band spacing; and $\sigma$ is the variance of the Gaussian curve. During the fit, the values of $A_0$, $\alpha_n$ (n=0, ..., N–1), $f_0$, $\Delta f$, and $\sigma$ are adjusted until the fit-convergence criteria are met. In other implementations, other suitable fitting functions may similarly be used. In one alternative implementation, Eq. (1) can be appropriately modified to take into consideration and fit fewer than N bands per band set. In principle, this approach may even work, albeit with lower accuracy, with a single transmission band per each of band sets $316_{-1}$ and $316_1$, provided that there is some prior or nominal knowledge of $\Delta f$ that enables one to obtain the middle frequencies of the other transmission bands in the band set by extrapolation from that single fitted transmission band.

Note that the spectral data corresponding to peak set 314 may not lend themselves to sufficiently accurate determination of the middle frequencies of the transmission bands in the 0-FSR order of optical multiplexer 130. This statement is true, for example, because laser lines 114 significantly distort the shapes of the peak bases that represent the 0-FSR transmission bands (see FIG. 1D) in peak set 314. However, the middle frequencies of the transmission bands in the 0-FSR order of optical multiplexer 130 can be determined with sufficiently high accuracy by interpolation from the middle frequencies of the corresponding bands in band sets $316_{-1}$ and $316_1$. For example, in one implementation, Eq. (2) may be used for such interpolation:

$$f_n^{(0)} = \frac{1}{2}(f_0^{(+1)} + n\Delta f^{(+1)} + f_0^{(-1)} + n\Delta f^{(-1)}) \quad (2)$$

where $f_n^{(0)}$ is the middle frequency of the n-th transmission band in the 0-FSR order of optical multiplexer 130; $f_0^{(+1)}$ is the middle frequency of the Gaussian peak corresponding to n=0 in band set $316_1$; $f_0^{(-1)}$ is the middle frequency of the Gaussian peak corresponding to n=0 in band set $316_{-1}$; $\Delta f^{(+1)}$ is the band spacing in band set $316_1$; and $\Delta f^{(-1)}$ is the band spacing in band set $316_{-1}$. In other implementations, other suitable interpolation methods may similarly be used.

At step 212, it may be determined whether or not another spectrum analogous to that shown in FIG. 3 is to be recorded at a different temperature T. If the answer is affirmative, then the processing of method 200 is directed back to step 202. Otherwise, the processing of method 200 continues on to step 214. Note that, often, spectral data corresponding to at least two different temperatures $T_i$ are collected.

At step 214, controller 170 may process the spectral data of steps 210 performed at least at two different temperatures $T_i$ to determine temperature $T_{MUX}$ that approximately best aligns the middle frequencies of the transmission bands in the 0-FSR order of optical multiplexer 130 with the specified frequency grid (e.g., an ITU grid). For example, if spectral data have been collected at temperatures $T_1$ and $T_2$, then the following exemplary procedure may be used.

At a first step of this procedure, a function of temperature ($f_n^{(0)}(T)$) given by Eq. (3) is constructed:

$$f_n^{(0)}(T) = \frac{f_n^{(0)}(T_2) - f_n^{(0)}(T_1)}{T_2 - T_1}(T - T_1) + f_n^{(0)}(T_1) \quad (3)$$

where $f_n^{(0)}(T_1)$ and $f_n^{(0)}(T_2)$ are the interpolation data of step 210 corresponding to temperatures $T_1$ and $T_2$, respectively (also see Eq. (2)). Although Eq. (3) uses a linear approximation, other suitable approximations may alternatively be used. Although one function $f_n^{(0)}(T)$, e.g., for n=0, may be sufficient for the determination of temperature $T_{MUX}$, two or more (e.g., up to N) such functions corresponding to different n values may similarly be constructed.

At a second step of the exemplary procedure, temperature $T_{MUX}$ is determined as the temperature value at which the deviations of the values of $f_n^{(0)}(T_{MUX})$ from the frequency grid are acceptably small. For example, if a single function $f_n^{(0)}(T)$ (e.g., corresponding to one selected n) has been constructed in the first step of the procedure, then $T_{MUX}$ can be determined by directly solving Eq. (3). If multiple functions $f_n^{(0)}(T)$ (e.g., corresponding to two or more different n's) have been constructed in the first step of the procedure, then $T_{MUX}$ can be determined by minimizing the sum of square deviations of values $f_n^{(0)}(T_{MUX})$ corresponding to different n's from their respective grid frequencies. In alternative implementations, other suitable error-optimization methods may similarly be invoked to find temperature $T_{MUX}$.

As part of step 214, after temperature $T_{MUX}$ has been determined, controller 170 configures temperature-control unit 180 to set the temperature of optical multiplexer 130 to $T_{MUX}$.

At step 216, each of lasers $110_1$-$110_N$ may be tuned to place the respective carrier frequency (wavelength) on a particular line of the frequency grid. The tuning of each individual laser 110 may be performed, e.g., in two sub-steps. In the first sub-step, the injection current applied to the laser cavity is set to a value corresponding to normal operation of the laser, which may be different from the injection-current value that was set at step 206. In the second sub-step, controller 170 configures the laser-control unit 118 attached to the laser, via the corresponding one of control signals $172_1$-$172_N$, to set the injection current and temperature of the laser to values that cause the carrier frequency (wavelength) generated by the laser to be on the frequency grid. More specifically, spectral analyzer 160 is configured to monitor the frequency (wavelength) of the corresponding peak in peak set 314 while the injection current and temperature are being adjusted to find a proper operating value. In various implementations of step 216, lasers $110_1$-$110_N$ may be tuned one at a time, more than one at a time, or all at the same time. After each of lasers $110_1$-$110_N$ has been appropriately tuned, the result may be that its respective laser line 114 (FIG. 1C) is appropriately positioned near the middle of the corresponding transmission band in the 0-FSR order of optical multiplexer 130 (FIG. 1D).

Figure 4:
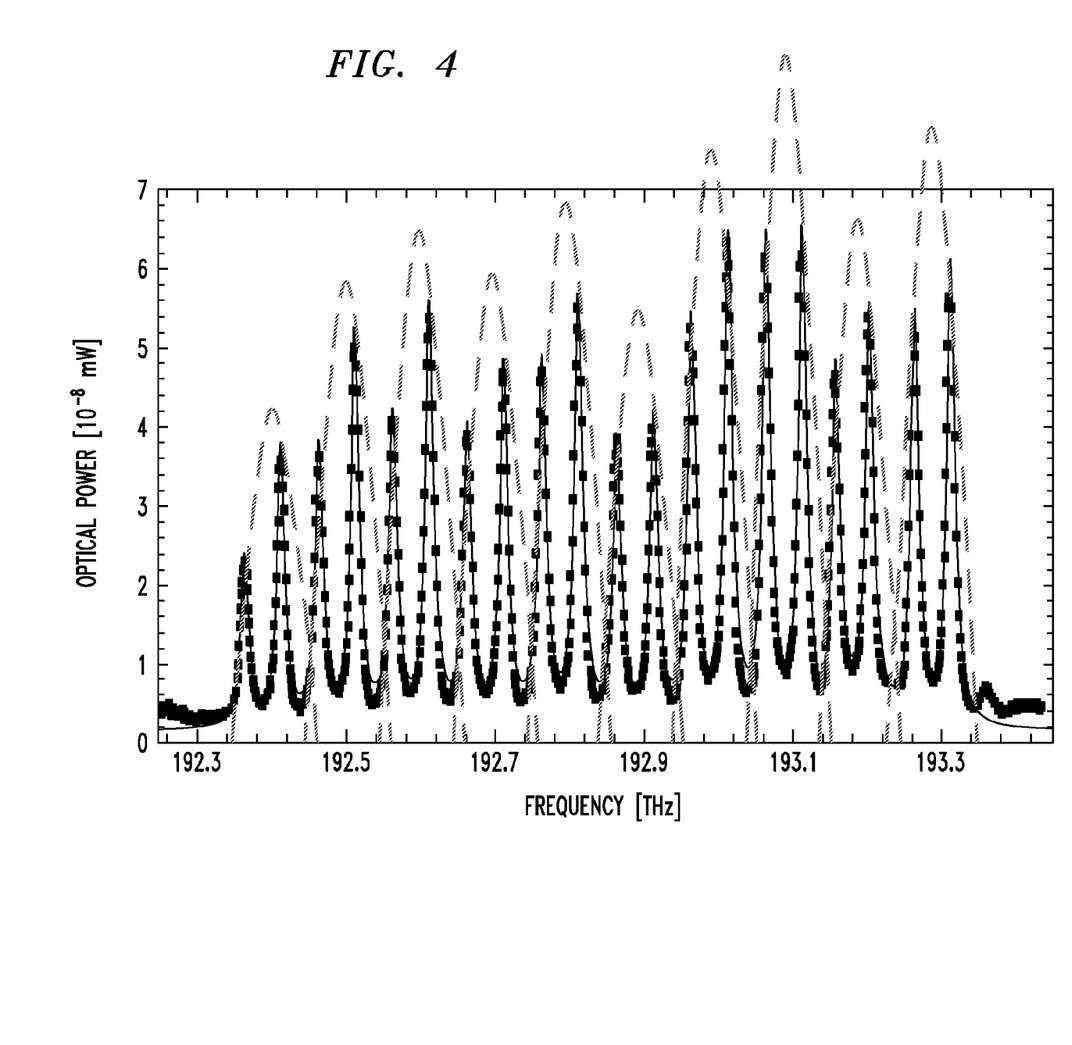
FIG. 4 graphically illustrates the effect of a representative etalon on the spectrum shown in FIG. 3.

FIG. 4 graphically illustrates an effect of representative etalon 140 on the spectrum shown in FIG. 3. More specifically, the data shown in FIG. 4 correspond to an etalon 140 having an FSR that is one half of the transmission-band spacing in optical multiplexer 130 (see FIG. 1D). The dashed lines in FIG. 4 show a spectrum corresponding to band set $316_{-1}$ (FIG. 3) that would have been recorded at step 208 of method 200 (FIG. 2) in the absence of etalon 140. The solid lines with solid squares in FIG. 4 show the spectrum that is observed when etalon 140 is present.

One skilled in the art will appreciate that the spectrum shown in FIG. 4 by the solid lines/squares is a product of the spectrum shown by the dashed lines and the transmission spectrum of etalon 140. In effect, the presence of etalon 140 causes optical analyzer 160 to sample the spectrum of signal 132 at 50-GHz intervals, with the sampling points being the points corresponding to the transmission resonances of the etalon. Therefore, the entire dashed-line spectrum can be reconstructed by shifting the transmission resonances of etalon 140 along the abscissa of FIG. 4 and measuring the spectrum of signal 132' at different positions of the resonances. The shift of transmission resonances can be performed in a continuous gradual manner or in several discrete steps.

As already indicated above in reference to FIGS. 1A-1B, controller 170 can configure temperature-control unit 190, via control signal $172_{N+2}$, to change the temperature of etalon 140. Provided that the temperature of optical multiplexer 130 remains constant, this temperature change will shift the transmission spectrum of etalon 140 with respect to the transmission spectrum of the optical multiplexer, thereby sampling the transmission spectrum of the optical multiplexer at different frequencies.

Figure 5:
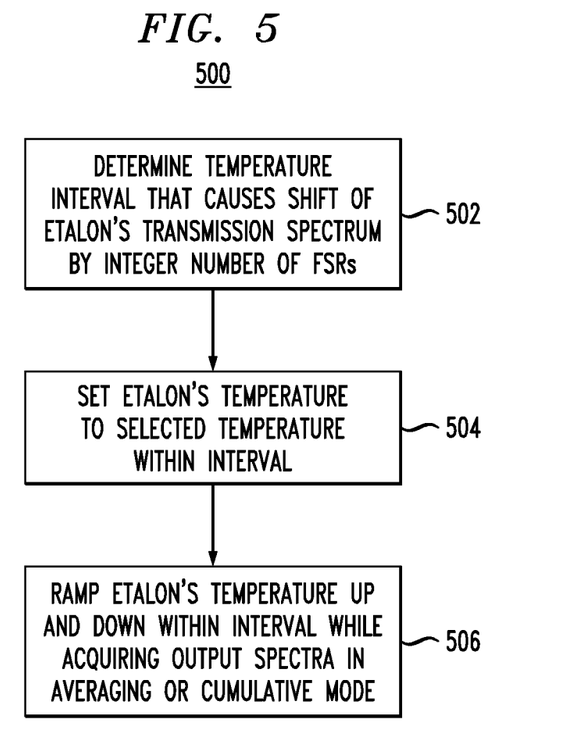
FIG. 5 shows a flowchart of a method that can be used to implement one of the steps of the method shown in FIG. 2 according to an alternative embodiment of the invention.

FIG. 5 shows a flowchart of a method 500 that can be used to implement step 208 of method 200 (FIG. 2) in the presence of etalon 140 according to an alternative embodiment of the invention. Note that method 500 is based on the above-described concept of changing the temperature of etalon 140 to shift its transmission resonances in a manner that enables controller 170 to reconstruct the transmission spectrum of optical multiplexer 130 even though the etalon's presence prevents a direct measurement of that transmission spectrum from one acquisition.

At step 502 of method 500, controller 170 determines a suitable temperature interval in which a temperature change from the lower to the higher boundary of the interval causes a shift of the transmission spectrum of etalon 140 by an integer number of the etalon's FSRs. For example, for an etalon corresponding to the data of FIG. 4, controller 170 may find a temperature interval in which the transmission spectrum of the etalon shifts by about 50 GHz, 100 GHz, or 150 GHz. Controller 170 can make this determination, e.g., by configuring spectral analyzer 160 to acquire, at each of several different temperatures of etalon 140, the spectrum of output signal 132' and then analyzing the acquired spectra to determine the rate, in GHz/K, at which the transmission resonances of the etalon shift with temperature.

At step 504, temperature-control unit 190 is configured to set the temperature of etalon 140 at a selected temperature within the temperature interval determined at step 502.

At step 506, temperature-control unit 190 is configured to ramp the temperature of etalon 140 up and down within the temperature interval determined at step 502 an integer number of periods. One temperature-ramp period generally consists of starting at the temperature that has been set at step 504, then going to one boundary of the temperature interval, then reversing the direction and going to the other boundary of the temperature interval, and finally coming back to the starting temperature. At the same time, spectral analyzer 160 is configured to run in an averaging mode or a cumulative mode, in which the recorded spectra are automatically averaged over time or added up to create a cumulative spectrum. One skilled in the art will appreciate that the resulting averaged or cumulative spectrum is an approximation of the spectrum that would have been recorded at step 208 of method 200 (FIG. 2) in the absence of etalon 140.

In an alternative embodiment, step 506 may be implemented using the sub-steps of: (i) recording the spectrum of output signal 132' at the temperature that has been set at step 504, with the temperature remaining constant during the spectrum acquisition; (ii) changing the temperature of etalon 140 to a next selected temperature from the temperature interval determined at step 502 while the spectrum acquisition is halted; (iii) recording the spectrum of output signal 132' at said next temperature, with the temperature remaining constant during the spectrum acquisition; (iv) repeating sub-steps (ii) and (iii) for a desired number of times; and (v) adding or averaging all of the recorded spectra, e.g., in digital form.

Further modifications of method 200 that can be used to accommodate the presence of etalon 140 may include one or more of the following. Prior to performing step 216 (see FIG. 2), temperature-control unit 190 may be configured to set the temperature of etalon 140 to a value that causes the appropriate transmission resonances in the transmission spectrum of the etalon to be located approximately near the middle of the corresponding transmission bands in the transmission spectrum of optical multiplexer 130. After performing step 216, temperature-control unit 190 may be configured to fine-tune the temperature of etalon 140 to more-accurately position the transmission peaks in the transmission spectrum of the etalon with respect to the corresponding laser lines 114. This fine-tuning may be accomplished, e.g., by changing the temperature of etalon 140 so that the optical power of signal 132' is maximized.

While this invention has been described with reference to illustrative embodiments, this description is not intended to be construed in a limiting sense. Although embodiments of the invention have been described above in reference to a WDM transmitter, the invention is not so limited. Based on the provided description, one of ordinary skill in the art will be able to practice various embodiments of the invention using other WDM devices, such as optical add-drop multiplexers, frequency converters, signal regenerators, and various optical filtering devices. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" and "controllers" may be provided through the use of dedicated hardware as well as hardware capable of executing software in association with appropriate software. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

What is claimed is:

1. An apparatus, comprising:
   a plurality of lasers, each laser configured to lase at a corresponding lasing wavelength;
   an optical multiplexer that is periodic in its frequency response and configured to receive light from the plurality of lasers, with each laser of the plurality being connected to a different optical input port of the optical multiplexer, wherein the optical multiplexer is configured to multiplex the light received from the lasers to produce an optical output signal;
   a spectral analyzer optically coupled to measure a spectral composition of the optical output signal over one or more wavelength ranges;
   a first temperature-control unit thermally coupled to the optical multiplexer; and
   a controller operatively connected to control the spectral analyzer to measure the spectral composition over said one or more wavelength ranges, wherein each of said one or more wavelength ranges excludes the lasing wavelengths; and
   wherein the controller is configured to adjust a spectral location of optical pass bands of the optical multiplexer based on the spectral composition measured by the spectral analyzer, said adjustment being performed by causing the first temperature-control unit to change a temperature of the optical multiplexer.

2. The apparatus of claim 1, further comprising:
   an optical etalon coupled to an output port of the optical multiplexer, wherein a filtered optical signal produced by the optical etalon is the optical output signal; and
   a second temperature-control unit coupled to the optical etalon, wherein the controller is operatively connected to control the second temperature-control unit based on the spectral composition measured by the spectral analyzer.

3. The apparatus of claim 2, further comprising a base plate, wherein:
   the first temperature-control unit is attached to the base plate;
   the second temperature-control unit is attached to the base plate so that there is an air gap between the first and second temperature-control units;
   the plurality of lasers are attached to the first temperature-control unit;
   the optical multiplexer is attached to the first temperature-control unit; and
   the optical etalon is attached to the second temperature-control unit; and
   wherein the apparatus further comprises a plurality of laser-control units, each laser-control unit coupled to a corresponding one of the lasers and configured to control the corresponding lasing wavelength.

4. The apparatus of claim 1, further comprising a plurality of optical modulators, each optically coupled between a respective one of the lasers and a respective one of the optical input ports of the optical multiplexer to modulate the light with data, wherein the first temperature-control unit is thermally coupled to the optical modulators.

5. The apparatus of claim 1, wherein the first temperature-control unit comprises a heater or cooler located along part of the optical multiplexer.

6. The apparatus of claim 1, wherein the controller is configured to adjust the spectral location of the optical pass bands of the optical multiplexer such that a series of regularly spaced pass bands thereof are spectrally aligned with a fixed regular wavelength grid.

7. The apparatus of claim 1, wherein said one or more wavelength ranges include a first wavelength range and a second wavelength range, said first and second wavelength ranges being disjoint from one another by a wavelength interval that includes the lasing wavelengths.

8. The apparatus of claim 7, wherein one or each of the first and second wavelength ranges has a respective width of at least a free spectral range of the optical multiplexer.

9. The apparatus of claim 7, wherein wavelengths of the first wavelength range are shorter than wavelengths in the wavelength interval, and wavelengths of the second wavelength range are longer than the wavelengths in the wavelength interval.

10. The apparatus of claim 1, wherein the controller is configured to further control the spectral analyzer to measure the spectral composition over a wavelength interval that includes the lasing wavelengths.

11. The apparatus of claim 10, further comprising a plurality of laser-control units, each laser-control unit coupled to a corresponding one of the lasers and configured to control the corresponding lasing wavelength, wherein the controller is configured cause the plurality of laser-control units to change the lasing wavelength of at least one of the lasers based on the spectral composition measured by the spectral analyzer over said wavelength interval.

12. The apparatus of claim 11, wherein a laser-control unit of the plurality of laser-control units is configured to change the corresponding lasing wavelength by changing at least one of a temperature and an injection current of the corresponding one of the lasers.

* * * * *